US008667506B2

(12) United States Patent
Zhang

(10) Patent No.: US 8,667,506 B2
(45) Date of Patent: Mar. 4, 2014

(54) OBJECT ORIENTED MANAGEMENT DEVICE FOR ASN.1 MESSAGE

(75) Inventor: Xinping Zhang, Shenzhen (CN)

(73) Assignee: ZTE Corporation (CN)

( * ) Notice: Subject to any disclaimer, the term of this patent is extended or adjusted under 35 U.S.C. 154(b) by 998 days.

(21) Appl. No.: 12/518,125

(22) PCT Filed: Dec. 6, 2007

(86) PCT No.: PCT/CN2007/003479
§ 371 (c)(1),
(2), (4) Date: Jun. 8, 2009

(87) PCT Pub. No.: WO2008/071070
PCT Pub. Date: Jun. 19, 2008

(65) Prior Publication Data
US 2010/0211930 A1 Aug. 19, 2010

(30) Foreign Application Priority Data

Dec. 11, 2006 (CN) .......................... 2006 1 0161181

(51) Int. Cl.
*G06F 9/44* (2006.01)
(52) U.S. Cl.
USPC ........... 719/316; 717/106; 717/108; 717/115; 717/116
(58) Field of Classification Search
USPC .......... 717/101–178; 709/200–201, 203, 220, 709/223–224, 230, 232; 715/763, 853; 719/313–316; 348/441, 461; 370/254, 370/352, 386
See application file for complete search history.

(56) References Cited

U.S. PATENT DOCUMENTS

| | | | |
|---|---|---|---|
| 5,941,978 A * | 8/1999 | Finni | 712/28 |
| 5,983,019 A | 11/1999 | Davidson | |
| 5,983,233 A * | 11/1999 | Potonniee | 1/1 |
| 6,208,345 B1 * | 3/2001 | Sheard et al. | 715/853 |
| 6,282,579 B1 * | 8/2001 | Carre | 719/313 |
| 6,317,428 B1 * | 11/2001 | Mercouroff et al. | 370/360 |
| 6,363,421 B2 * | 3/2002 | Barker et al. | 709/223 |
| 6,915,324 B1 * | 7/2005 | Allavarpu et al. | 709/200 |
| 7,478,403 B1 * | 1/2009 | Allavarpu et al. | 719/316 |
| 7,647,415 B1 * | 1/2010 | Sandoz et al. | 709/230 |
| 7,783,720 B1 * | 8/2010 | Allavarpu et al. | 709/218 |
| 2003/0179315 A1* | 9/2003 | Collins et al. | 348/441 |
| 2004/0006608 A1* | 1/2004 | Swarna et al. | 709/220 |
| 2005/0114355 A1* | 5/2005 | Nuttila | 707/100 |
| 2005/0246679 A1* | 11/2005 | Grosshart et al. | 717/104 |
| 2006/0074975 A1 | 4/2006 | Tunar et al. | |

FOREIGN PATENT DOCUMENTS

CN 1521989 A 8/2004

* cited by examiner

*Primary Examiner* — Lewis A Bullock, Jr.
*Assistant Examiner* — Francisco Aponte
(74) *Attorney, Agent, or Firm* — Brooks Kushman, P.C.

(57) ABSTRACT

An object-oriented management device for ASN.1 message is provided, which includes: an ASN.1 bottom supporting module for compiling the ASN.1 message into programming language example code; a common manipulation module for processing the message to support the message applications; a message plug-in for creating the message corpus plug-in from the code generated by the common manipulation module, with the class description table being the plug-in interface. The present invention solves the problem that the message structure example should be re-established after the message is persistently saved, overcomes the disadvantage that the data type of the bit stream must be known in advance for decoding, decreases the difficulty of message construction, and significantly lessens the workload of the message development and maintenance.

14 Claims, 4 Drawing Sheets

OBJECT ORIENTED MANAGEMENT DEVICE FOR ASN.1 MESSAGE

TECHNICAL FIELD

The present invention relates to a management device for ASN.1 message, and more specifically to an object-oriented management device for ASN.1 message.

BACKGROUND

ASN.1 (Abstract Syntax Notation 1) is the standard defined by ITU for the format of the messages transmitted on network and it provides a standard format for data conversion among the nodes. Each node only cares about those translated from/to ASN.1 while does not necessarily know the format of the data saved in anywhere on network. ASN.1 consists of two parts, one part is ISO 8824/ITU X.208 which describes the data, data type and sequence format in the message, that is, the grammar of data; the other part is ISO 8825/ITU X.209 which describes how to combine each part of data into a message, that is, the basic data encoding rule, which was initially developed as a part of X.409, and later independently become a standard. The $1^{st}$ generation PKI (Public Key Infrastructure) standard is mainly based on ASN.1, and it is used in SNMP to define the format of the SNMP protocol data unit and object and is widely applied in other areas of the communication and computer.

Therefore, the way of using the format of ASN.1 message to communicate is the common way in telecommunication network management system.

ASN.1 message has the following characteristics:

1. The message has a tree structure which can define hierarchical message nesting as desired.

2. The type of a node in the message can be various, and it can be a simple data type such as INTEGER, GRAPHICSTRING, ENUM, and so on; or a composite data type including children nodes, such as SET, SEQUENCE, SET OF or SEQUENCE OF.

3. In the structures of SET and SEQUENCE, a certain node may not exist, since the corresponding message node is allowed to be set as OPTIONAL which means "may or may not exist".

4. When ASN.1 message is used, firstly an ASN.1 structure is defined in the ASN.1 message, and then is compiled into an intermediate programming language structure such as Java, C++ by a compiler, and then the communication is implemented by using the corresponding programming language structure.

5. ASN.1 supports BER (Basic Encoding Rules), DER (Distinguished Encoding Rules) and VAL (ASN.1 value notation) to encode the intermediate language structure example into bit stream, but there is a problem when the bit stream is decoded into the medium language structure example. Firstly, it needs to know the structure corresponding to the bit stream so as to use the decoding method of the structure to decode, and if the structure includes ANY (the uncertain type), the data of this type can only be further decoded after its specific type is determined through other member field.

The typical method of using ASN.1 message in C/S software is:

1. Establishing the connection between a client and a server;

2. Interacting the protocols between the client and the server:

a) A message sender filling in the ASN.1 message header and body, wherein the header includes a command code, and the body applies the type of ANY, and its real data type varies depending on the command code;

b) The message sender encoding the message into a bit stream and sending it to a message receiver;

c) The message receiver receiving the bit stream, decoding the message header, and then decoding the message body with the special data type according to the command code therein;

d) The message receiver responding according to the content of the message;

3. The interaction being completed and the connection being disconnected.

A stimulated message is always needed in the interface test tool of message, and the stimulated message has two origins, one is to generate through the explanatory script language and the other is to establish examples of the message structure and further modify the examples through persistent data. However, in application programs, sometimes the message should be persistently saved as a file or saved into the database, and reconstruct the message from the persistent message. Also, it is desired that the data in the file is readable and the data in it can be modified.

Generally, BER is used for transmission in the network management subsystem. However, because it is unreadable and it can not directly recover the ANY data, the BER bit stream is not good for persistently saving the message, so as the DER, which is a BER with unique encoding. While VAL (ASN.1 VALue notation) is a readable name value character format which uses "{" and "}" to perform hierarchical nesting tree marker structure and has the following features:

1. The non-outermost node applies the format of "name value", and the outermost root node applies the format of "data structure type name value".

2. For SET, SEQUENCE value, the data is bracketed into "{" and "}", and the "," is used to separate the members.

3. For SET OF, SEQUENCE OF value, the data array is bracketed into "{" and "}", and the "," is used to separate the elements in the array.

4. For the ANY value, if the data in it is byte string, it is displayed using Hexadecimal system; and if it is a special ASN.1 data type, it is displayed using the format of "special data structure type name value".

The characteristics of the VAL format make it possible to be directly recovered as ASN.1 message example from the bit stream. However, the present ASN.1 compiling platforms including DSET and ESNACC do not support the function of completely recovering the example of ASN.1 message.

SUMMARY OF THE INVENTION

The present invention offers an object-oriented management device for ASN.1 message to solve the technical problem that the message structure example should be re-established after being persistently saved, to overcome the disadvantage that the decoding could be performed only if data type of the bit stream should be known in advance, to decrease the difficulty of message construction and to significantly lessen the workload of message development and maintenance.

In order to solve the above technical problem, the present invention offers an object-oriented management device for ASN.1 message, which includes:

an ASN.1 bottom support module for compiling the ASN.1 message into the programming language example code;

a common manipulation module for processing the message to support the message applications;

a message plug-in for generating a message corpus plug-in from the code generated by the common manipulation module, with class description table being the plug-in interface;

wherein the common manipulation module or message plug-in is used to modify the programming language example code generated by the ASN.1 bottom support module, to use virtual functions to supplement the class description information including class structure description information and the functions for creating the class example; to add the support of class example manipulation for the generated code; to establish TopClass class description table including the corresponding relationship between the TopClass name and description in the generated code, and the TopClass is the top-layer class rather than the child-classes.

Furthermore, said programming language example code is C++ or JAVA programming code.

Furthermore, for simple data type and composite data type, said common manipulation module or message plug-in supplements the type name, integer value and class example create function of the data type; for SET and SEQUENCE data, supplements the name of each member, sets whether the data type is optional and supplements the corresponding table of the member's description information; for ENUM, supplements the corresponding table between the member symbol and number value.

Furthermore, said common manipulation module or message plug-in adds the class description table in the programming language example code, shows the class description information in the form of class description table, takes the class name as the key word, and sorts the elements in the table according to the class name or makes them as harsh table to be indexed conveniently.

Furthermore, for simple data type, adding the support of the class example manipulation in the programming language example by the common manipulation module or message plug-in includes:

adding the support of virtual functions to obtain and set the data value;

for composite data type, adding the support of the class example manipulation in the programming language example code by the common manipulation module or message plug-in includes:

a) adding the support of point marker path;

b) adding the support of setting a symbol to show whether the members in SEQUENCE and SET exist or not;

c) adding the support of obtaining the length of data array, setting the length of data array and traversing the elements in the data array for the SEQUENCE OF and SET OF data array;

d) adding the support of the selection operation for the CHOICE data;

e) adding the support of setting the ANY data, which can set or obtain the variable of the real type;

f) adding the support of obtaining the object of the corresponding child-node through the point marker path.

Furthermore, the common manipulation module uses AsnTreeObject tree link list to indicate the structure of the ASN.1 message.

Furthermore, the common manipulation module or the message plug-in is used to generate VAL data from the generated code.

Furthermore, the common manipulation module or the message plug-in is used to recover the programming language message example from the VAL data.

Furthermore, the common manipulation module or the message plug-in is used to convert the VAL data into XML data.

Furthermore, said object-oriented management device for ASN.1 message also comprises graphic interface package and graphic message edition module, Said graphic interface package is used to develop graphic interface;

Said graphic message edition module uses the graphic package and the common manipulation module to provide the users with graphic interface message edition function to modify, create and edit the ASN.1 message by the way of modifying the AsnTreeObject tree link list table.

Furthermore, said object-oriented management device for ASN.1 message also comprises the script support package and the message script manipulation module.

Said script support package is used to run the script and support the script extension;

Said message script manipulation module uses the script support package and the common manipulation module to add ASN.1 message manipulation function in the script to modify, create and edit the ASN.1 message by the way of modifying the AsnTreeObject tree link list.

The present invention has the following advantages:

1. The ASN.1 message can be persistently saved, and the persistently saved data can be recovered as data structure example, and the ANY data in the data have also been decoded.

2. The message can apply name value string symbol manipulation to easily modify the message and support script language to establish ASN.1 message.

3. The message generation method is independent from the message definition, and the ASN.1 message corpus can apply the way of plug-in which is automatically generated by MAKEFILE compiling ASN.1 file, to facilitate modification and update of the message and to lessen the workload of maintenance.

4. The device is universal and does not rely on a special ASN.1 structure type or ASN.1 compiler.

PREFERRED EMBODIMENTS OF THE PRESENT INVENTION

The present invention will be described in further detail with reference to the accompanying figures and embodiments.

Figure 1:
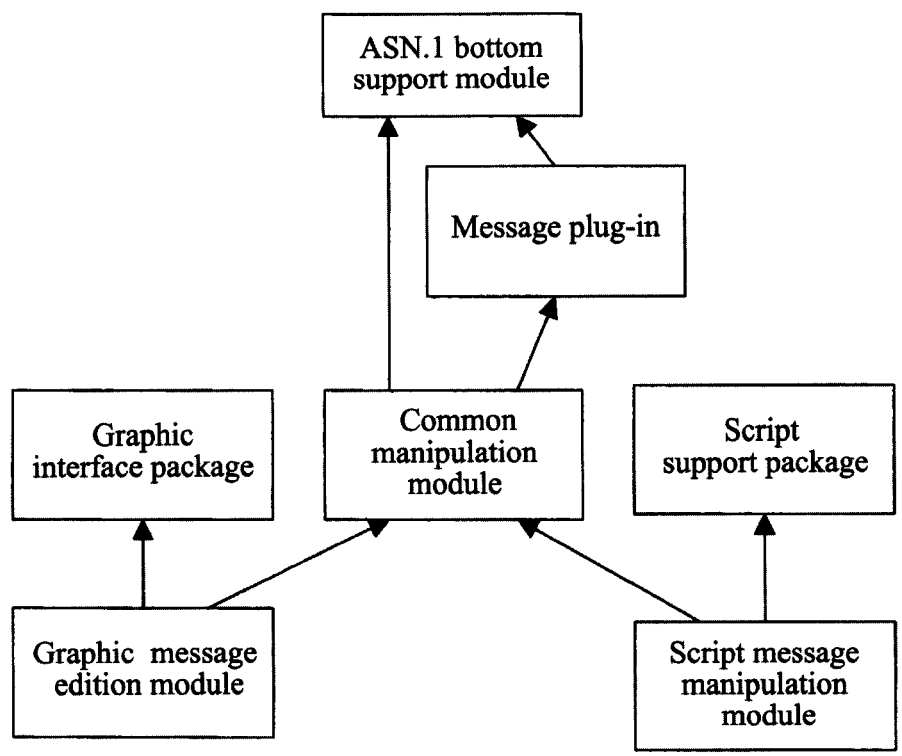
FIG. 1 illustrates the composition of the embodiment in accordance with the present invention.

As shown in FIG. 1, the ASN.1 bottom support module use ASN.1 structure to make a message plug-in, and some common manipulations are performed based on the message plug-in, and then based on this to make graphical message editing and script message manipulation. The message common manipulation comprises any basic application encapsulation including creating and modifying special type messages and creating, encoding and decoding VAL files.

The ASN.1 bottom support module: compile the ASN.1 files into code of special programming language such as C++ or Java, and compile the ASN.1 structure into a class of the programming language. The ASN.1 bottom support module offers support of the generated code manipulation. For example, C++ generally offers several libraries including the basic classes of the ASN.1 special language and some functions of supporting manipulation for the generated code to call.

The message plug-in: in order to uniformly process the ASN.1 message corpus, the programming code is generated from ASN.1 message by the ASN.1 compiler, and after being improved according to certain interface function requirements, it is compiled into a library through the language compiler. Then it can be dynamically loaded by an application program. The plug-in can uses scanning program to process the generated program code and generate a library through the language compiler. Therefore, other application modules only rely on the interface and there is no need for them to change as the message corpus changes. For example, C++ could generate the dynamic library with a special interface; JAVA can package a class which supports a special interface, load the package when running the code, and create a JAVA class to support the special interface through class reflection.

The common manipulation module: uniformly process the message based on the ASN.1 bottom support module and the message plug-in interface to conveniently support the manipulations of the message application module, such as creating a class instance, modifying the members of class data, generating message from the VAL data and comparing two messages.

The graphic interface package: offered by a third party and can be easily used by users to develop graphic interfaces.

The graphic message edition module: using the graphic package and the ASN.1 common manipulation module to offer the users the function of friendly graphic interface message edition, thus the users can create and edit the ASN.1 messages in the form of tree list including the field name, type name, integer value, the length of the data member and the value of the data member. It can open and save the VAL format.

The script support package: a package for running the scripts and supporting the script extension, such as PYTHON or TCL, which explains the manipulation with relatively low efficiency but can be easily used on multi-platforms; and the package can be extended by languages such as C++.

The message script manipulation module: use the script extension support module and the ASN.1 common manipulation module to add the function of ASN.1 message manipulation in the scripts to make the users easily access to the messages by scripts.

Figure 2:
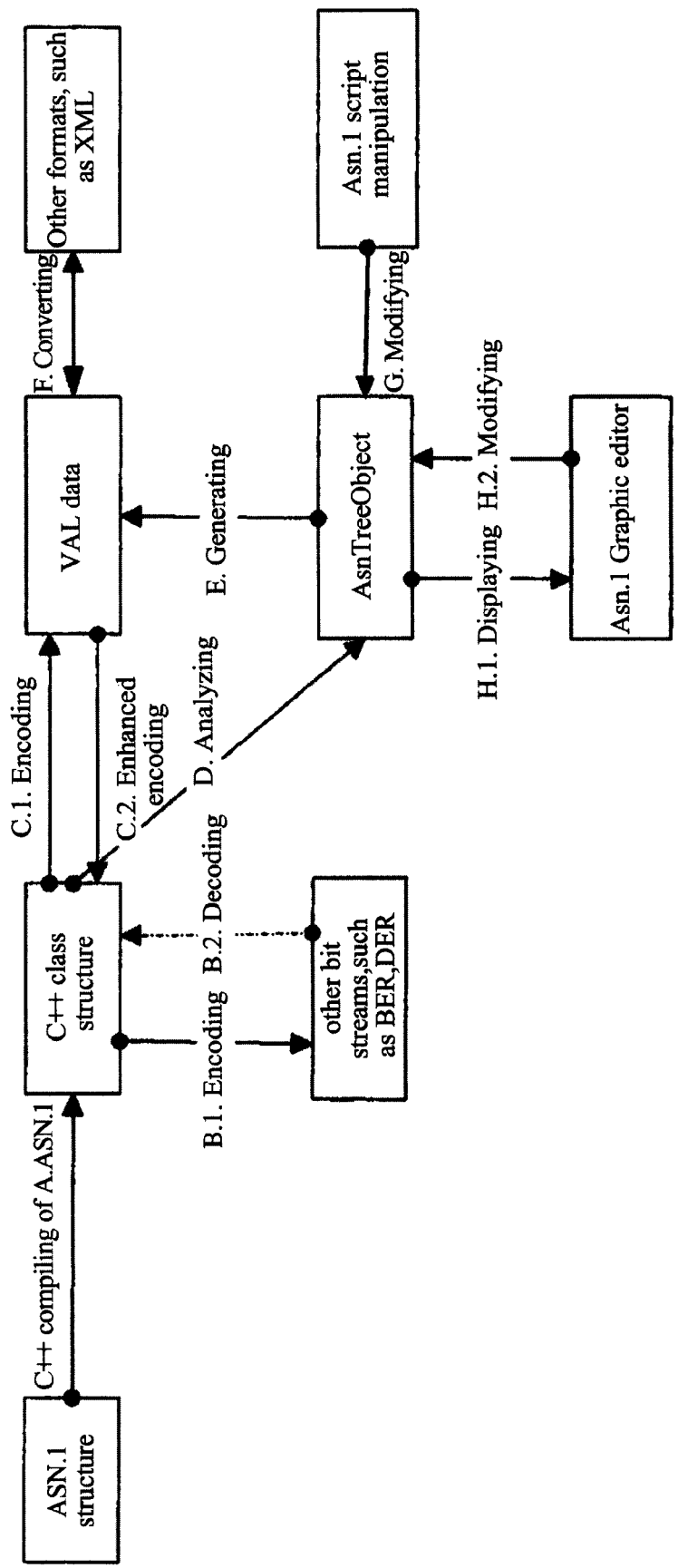
FIG. 2 illustrates the process of message conversion.

FIG. 2 describes the inter-conversion among the ASN.1-related messages, the ASN.1 structure definition, C++ corresponding class structure and the bit stream format. It also shows the process of conversion between the data manipulated by the ASN.1 script manipulation module and the ASN.1 graphic edition module and the message data. Specifically, with the method C.2 of the present invention, the persistently saved VAL message can be completely recovered as C++ class example, and be further encoded. The method of the present invention also supports G and H applications.

Step A: C++ class structure can be generated from ASN.1 file through the C++ compiler of the ASN.1 and class structure example can further be created.

Step B.1: C++ class structure example can be encoded into BER or DER bit stream.

Step B.2: BER or DER bit stream can be decoded into specific C++ class structure example.

Step C.1: VAL data can be generated from the C++ class structure example.

Step C.2: VAL data can be completely recovered as C++ class structure example through the method of the present invention.

Step D: the C++ class example can be analyzed to generate a tree-structured AsnTreeObject.

Step E: VAL data can be generated from the AsnTreeObject.

Step F: other formats, such as XML and VAL, can be inter-converted.

Step G the ASN.1 scripts can further create C++ class structure example by modifying AsnTreeObject.

Step H.1: AsnTreeObject can be displayed in the graphic editor.

Step H.2: the ASN.1 graphic editor can generate AsnTreeObject.

The method of message construction will be described in detail with reference to an example of network management test platform, and for the DSET ASN.1 compiling platform and the ESNACC ASN.1 compiling platform, the present invention implements the message editor and the method of using script to create the messages. Although the present invention is mainly discussed using C++, it can be implemented using other object-oriented programming language, such as JAVA.

The container:

The present invention uses a container to buffer the information of the message nodes which needs to be compared. In practice, the container can be a deque, a list or a stack. In the following, the comparison method of the present invention will be described by taking the deque as an example. Deque widely means an idea of process which can be implemented through self-definition or using the deque type STL::list offered in the STL (Standard Template Library). The string type ansistring used in the present invention can be std::string, CString in MFC or self-defined.

Test message origin:

The message used in the present invention is originated from the message in subsystem communication of several tested network management projects. Since the versions of the network management are different, the new version message has certain addition or deletion, which requires that the test platform can simulate the message, edit the message through the message editor, quote or create the message through script.

The implementation of ESNACC platform:

(1) The Compiling Platform

Figure 3:
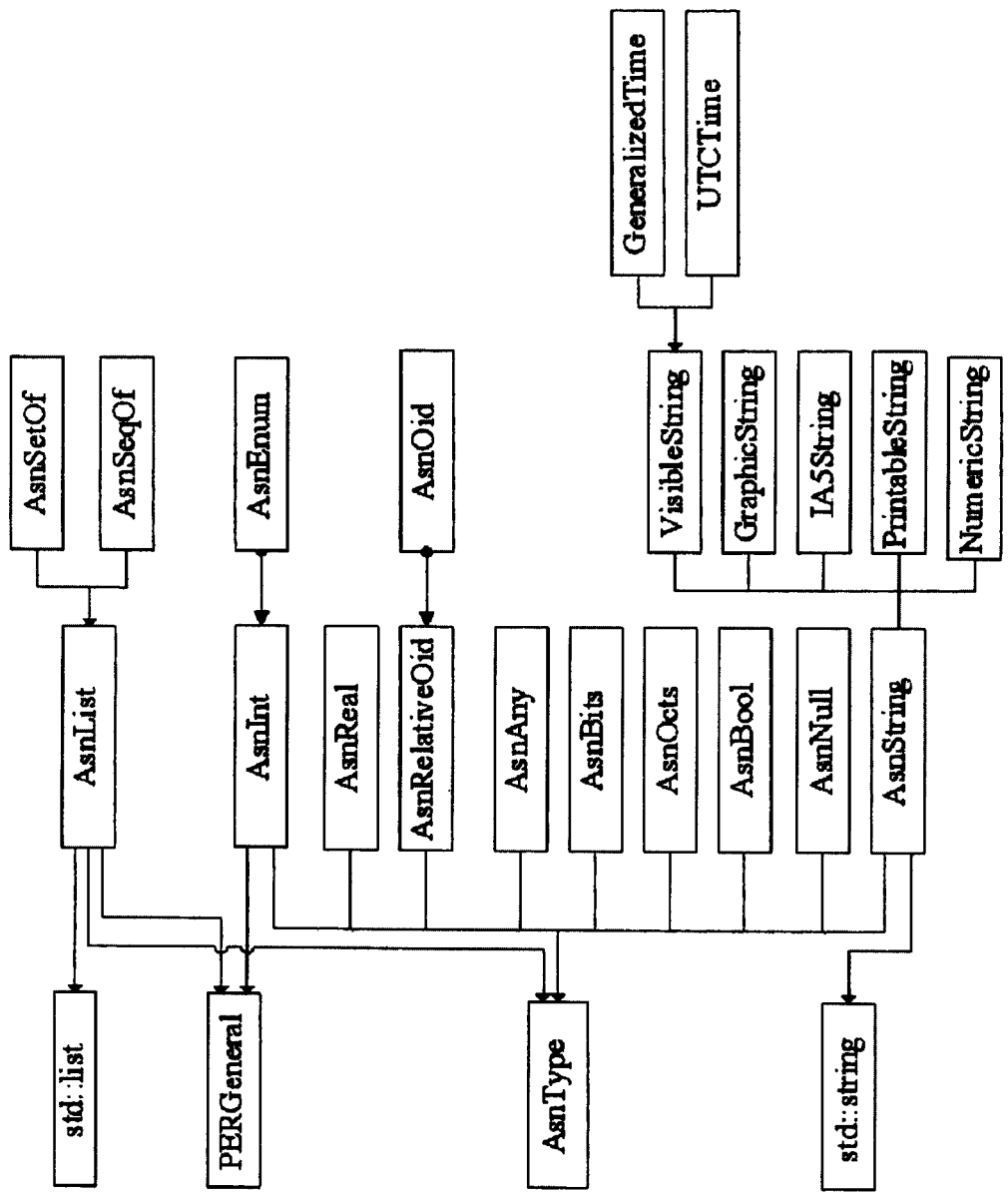
FIG. 3 is the inheritance system of ESNACC C++ basic class structure.

ESNACC is an ASN.1 compiler with open source code which supports BER and PER and can output only VAL data, but cannot decode the VAL data as C++ structure example. SEQUENCE OF and SET OF apply the template class and has no uniform basic class member function to support manipulating the length of the data array and traversing the nodes of the data array. Referring to FIG. 3 for the basic class inheritance system of the top basic class of the AsnType and the inheritance system of the ESNACC message type, FIG. 3 is the hierarchical graph of the ESNACC basic class inheritance relationship, and the ESNACC basic class is AsnType which is an abstract basic class. Based on this, it inherits some simple types to support basic ASN.1 data types such as AsnInt, AsnReal, AsnRelativeOid, AsnAny, AsnOcts, AsnBool, AsnNull and AsnString, wherein AsnInt is also derived from PERGgeneral, AsnEnum is derived from AsnInt and AsnOid is derived from AsnRelativeOid; AsnList is an intermediate class which realizes other ASN.1 classes, AsnSetOf and AsnSeqOf are derived from AsnList; std::string and std::list in STL are used to further support SEQUENCE OF and SET OF. Some applied string types such as VisibleString, GraphicString, Ia5String, PrintableString and NumericString are derived from the basic string type AsnString, wherein, GeneralizedTime and UTCTime are derived from VisibleString.

(2) The Flow of Message Manipulation

Since the interface test tool needs to process ASN.1 based message, it needs to offer an ASN.1 message editor to create a message through the graphic interface; the test tool supports the script to manipulate the message, including modifying the value and the data length. The workload will be large if starting from the bottom encoding and decoding of the ASN.1 message, and thus it needs to use the present ASN.1 compiler, on the basis of which, the compiler is modified or the generated C++ code of the ASN.1 message is second-scanned to generate the desired C++ programming code. This is the processing method mainly for creating the message plug-in.

1. The ESNACC basic class comprises class description information including the creation function of the corresponding type, and since the description information of some generated C++ structures, such as INTEGER (1 . . . 200), are not complete, the description information needs to be complemented through modifying the compiler.

2. The basic manipulations of the C++ class example can be implemented, but point marker path is not supported, and has no virtual function to obtain and set the data value; For SEQUENCE OF and SET OF, there is no manipulation of unifying data array length. A point marker path support function is added to support obtaining the object of the corresponding child-node through the point marker path and creating a non-existent member through parameter selection; A member function is added in the AsnType to define the virtual function interface in the AsnType to obtain size, set size and obtain the functions of all child member nodes. Virtual function is implemented in the template class AsnList to obtain size, set size and obtain the functions of all child member nodes.

3. The TOPCLASS class description table is established, and the ESNACC supports the META information to be compiled, generating class description table const AsnModuleDesc *asnModuleDescs[ ]. In order to search elements quickly through the class description table, the table can be further converted into a map with the name as the key word or sequential data array.

4. The code in steps 1 to 3 is generated into a DLL, and variable asnMoudleDescs can be derived from the function AsnModuleDesc **GetMoudleDescs( ) and all TOPCLASS classes can be derived if desired, Thus it becomes a plug-in whose interface is GetMoudleDescs, and all TOPCLASS description can be obtained through this structure, creating and modifying their examples. The asnMoudleDescs pointer can be registered when the plug-in is loaded or after the plug-in is loaded. Step A in FIG. 2 is implemented and the above steps 1 to 4 are implemented in the message plug-in shown in FIG. 1.

5. AsnTreeObject can be defined as:

```
class AsnTreeObject {
public:
    ansistring nodename;
    ansistring nodeVALue;
    int ans1type;
    ansistring typename;
    AsnType *pParent;
    AsnTreeObjectList childrenlist;
};
```

AsnTreeObjectList is the list of AsnTreeObject point. Certainly, this structure can add other extra data as desired. This structure is convenient to be traversal displayed and modified. Interrelatedly, steps D and E in FIG. 2 are implemented. This content is implemented in the common manipulation module in FIG. 1.

6. The ASN.1 C++ message structure example and the VAL data are mutually generated, and the PrintVAL for generating VAL data can be a member function in AsnType, or an independent function with AsnType point as the parameter. The function generating ASN.1 C++ example from the VAL data can be an independent function which uses the VAL data as its parameter, and the AsnType point as its parameter and the error code as the return value, and it also can be a static member function of the AsnType with the same function format. If it is a static member function, the function of this part should be implemented in the plug-in, if it is an independent function, it should be implemented in other modules outside the plug-in. The steps C1 and C2 in FIG. 2 are implemented. Step C.1 can be implemented by using the operations in the above step 1 and step 2, and implementing C.2 needs to use the operations in the above steps 1, 2 and 3. This part is implemented in the message plug-in in FIG. 1.

7. In order to edit a message in the graphic editor, the type names of all ASN.1 structures should be listed, and firstly the example creation function is obtained from asnMoudleDescs according to the message type, and then the message is displayed using the AsnTreeObject in step 5 above, and the AsnTreeObject is edited according to the constraint information of the message class description to further generate VAL data, and generate ASN.1 C++ example from the VAL data. The main reason of generating C++ class example from the VAL data while not directly from AsnTreeObject is that it is easy to generate VAL data and relies less on the compiling platform basic class structure system, and thus the compiling platform has a good transportability. With the above method, the message can also be created and modified through script, and persistently saved in VAL data.

8. ASN.1 message manipulation is supported using PYTHON script language through script extension, and thus the message is created and used in the test tool through the script.

The implementation of DSET platform:

In order to further describe the technical scheme of the present invention, the present invention will be described in further detail by taking compiling platform DSET as an example with reference to the embodiments and the accompanying figures.

(1) The Compiling Platform

Figure 4:
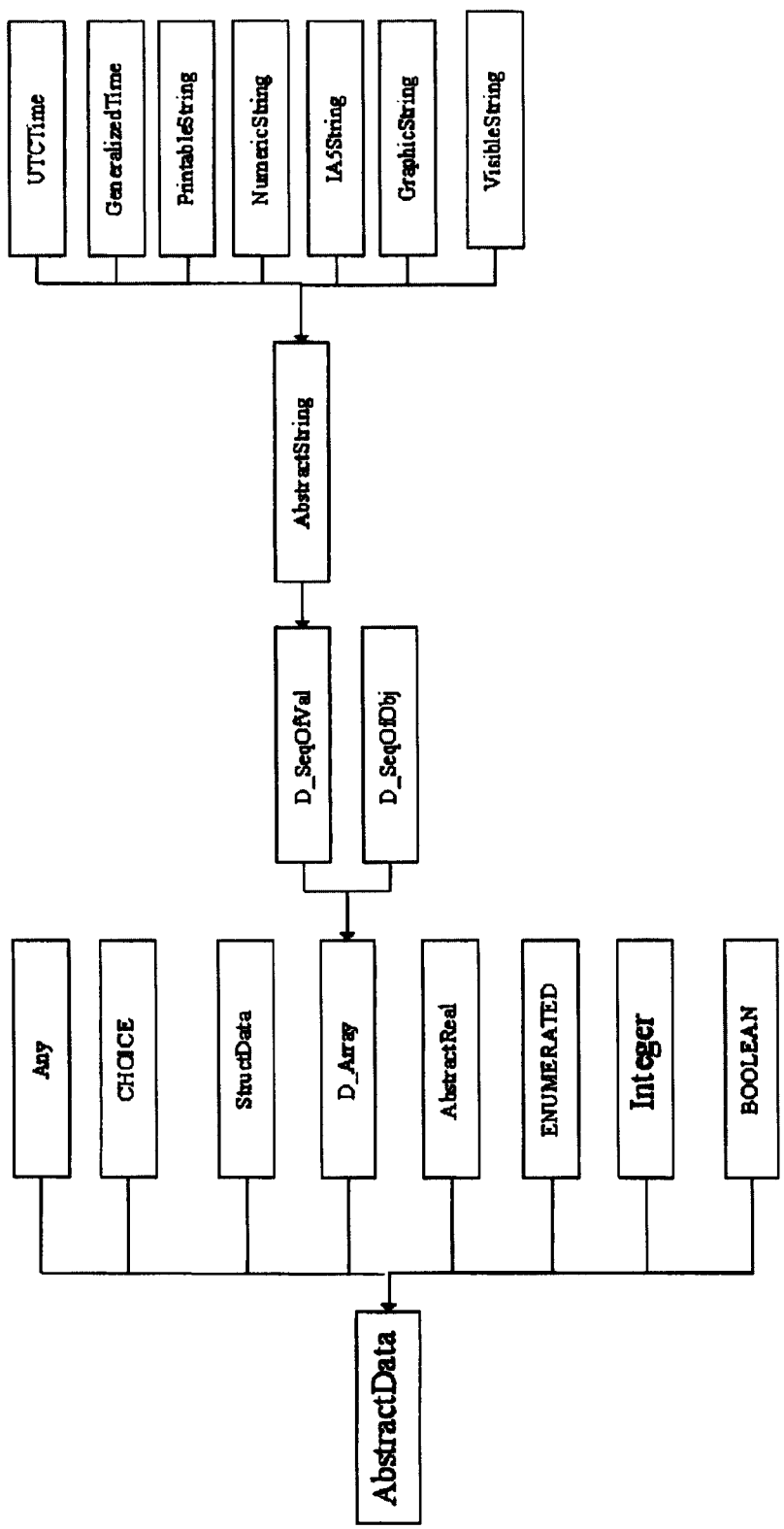
FIG. 4 is the inheritance system of DSET C++ basic class structure.

To be compiling platform, DSET is a commercial ASN.1 compiler without open source code which supports BER, PER and DER, can output VAL data, and modify the data members in C++ class example through the VAL data, but can not identify the real type of the ANY data. The ENUM description information is too weak to directly obtain the corresponding table of the symbol name string and the data value, and it has no TOPCLASS class description table. Referring to FIG. 4 for the basic class inheritance system, FIG. 4 is the hierarchical graph of the DSET basic class inheritance relationship, and its basic class is AbstractData, which is an abstract basic class, from which some basic types such as CHOICE, AbstractReal, EUNMERATED, Integer, BOOLEAN and Any inherit directly; StructData, D_array, D_SeqOfVal and D_SeqOfObj are intermediate types which are used to implement other Asn.1 classes, D_SeqOfVal and D_SeqOfObj are derived from D_Array, AbstractString is derived from D_SeqOfVal, and UTCTime, GeneralizedTime, PrintableString, IA5String, GraphicString and VisibleStri are derived from AbstractString.

(2) The Flow of Message Manipulation

When making an interface test tool based on ASN.1 message, an ASN.1 message editor needs to be provided to create message through the graphic interface; the test tool supports the script to manipulate the message, including modifying the value and the data length. The workload will be large if starting from the bottom encoding and decoding of the ASN.1 message, and thus it needs to use the present ASN.1 compiler, on the basis of which, the C++ code generated by compiling the ASN.1 message is second-scanned to generate the desired C++ programming code. This is the processing method for mainly creating the message plug-in.

1. The DSET basic class already has comprised class description information including the creation function of the corresponding type, and the type is D_AdType and each type corresponds to a D_AdType global class description variable. Since the description information of some generated C++ structures, such as ENUM, is not complete, it needs other methods to obtain the corresponding table of the symbol name string and the number value.

2. The basic manipulations for the C++ class example has already been performed and the class description information can be obtained in the class example through const D_AdType* get_adType( ), but does not completely support point marker path, and has no uniform function to obtain and set the data value; A point marker path support function is added, and these two parts can be implemented in other modules outsides the message plug-in.

3. The TOPCLASS class description table is established, the DSET compiling platform does not support the class description table, and all TOPCLASS classes could be obtained through secondly scanning the ASN.1 files or scanning the generated C++ code to generate the class description table. In MAKE FILE, the class description table can be generated through scripts AWK and SED scanning or other program scanning.

4. A DLL is generated from the codes in step 1 to 3, and by deriving the function AdTypeEntry *getAD_TypeTbl( ) class description table and the table length, all TOPCLASS classes can be derived as desired and C++ header file can be re-generated by re-scanning. Thus it becomes a plug-in whose interface is getAD_TypeTbl( ), and all TOPCLASS description can be obtained through this structure to create and modify their examples. The class description table can be displayed and registered after loading the plug-in. Step A in FIG. 2 is implemented and the above steps 1 to 4 are implemented in the message plug-in shown in FIG. 1. The part of ENUM in step 1 can be implemented in the common manipulation module.

5. AsnTreeObject can be Defined as:

```
class AsnTreeObject {
public:
    ansistring nodename;
    ansistring nodeVALue;
    int ans1type;
    ansistring typename;
    AbstractData *pParent;
    AbstractDataList childrenlist;
};
```

Certainly, this structure can add other extra data as desired. This structure is convenient to be traversal displayed and modified. With the same method, steps D and E in FIG. 2 are implemented.

6. The ASN.1 C++ message example and the VAL data are mutually generated, and the generated VAL data function is a member function of AbstractData; The function for generating ASN.1 C++ example from the VAL data can be an independent function which uses the VAL data as its parameter, the AbstractData point as its parameter and the error code as the return value. Since this function cannot modify the program of DSET basic class, the independent function can only be implemented in other module outside the plug-in. The steps C1 and C2 in FIG. 2 are implemented. Step C.1 can be implemented using the operations in the above step 1 and step 2, and implementing C.2 needs to use the operations in the above steps 1, 2 and 3. The part is implemented in the message plug-in in FIG. 1.

7. In order to edit a message in the graphic editor, the type names of all ASN.1 structures should be listed. Firstly the example creation function is obtained from the class description table according to the message type, and then the Asn-TreeObject in step 5 is used to display the message, and the AsnTreeObject is edited according to the constraint information of the message class description to further generate VAL data, and generate ASN.1 C++ example from the VAL data. The main reason of generating C++ class instance from the VAL data but not directly from AsnTreeObject is that it is easy to generate VAL data and relies less on the compiling platform basic class structure system, and thus the compiling platform has a good transportability. With the above method, the message can also be created and modified through script, and persistently saved in VAL data.

8. With the development of the XML format, the XML of the ASN.1 message can comprise all information of the VAL format, including the pair of name value and the symbol, the outer layer structure type, the real type of ANY. Therefore if only those data formats including the VAL information can be mutually converted with VAL format on the basis of plug-in description information. Furthermore, XML file can replace VAL data.

It should be noted that, those skilled in the field can make various modification or variations which should fall into the scope of the claims of the present invention according to the technical solution illustration and the specified embodiments of the present invention. For example, with the rising of the XML format, the XML of the ASN.1 message can comprise all information of the VAL format, including the pair of name value and the symbol, the outer layer structure type, the real type of ANY. Therefore if only those data formats including the VAL information can be mutually converted with VAL format on the basis of plug-in description information. Furthermore, XML file can replace VAL data in patent.

The present invention solves the problem that the message structure example should be re-established after the message is persistently saved, overcomes the disadvantage that the data type of the bit stream must be known in advance for decoding, and the ANY data can be decoded into a specific data type, the member data can be further modified after the message is established, and the modification can be performed with the way of string, thus the script structure example can be created and modified through explanation, furthermore, the ASN.1 message can be made into a plug-in, and the method of message generation is independent from the message definition, with the present ASN.1 compiler, it supports both the graphic interface ASN.1 message editor and the script to access to the ASN.1 message. If the message definition is changed, if only the generated plug-in is re-edited while the generation method is the same, the difficulty of message construction is reduced, and the workload of message development and maintenance is significantly lessened.

INDUSTRIAL APPLICABILITY

The present invention has the following advantages:

1. The ASN.1 message can be persistently saved, and the persistently saved data can be recovered as a data structure example, and the ANY type data are also decoded.

2. The message can apply name value string symbol manipulation to easily modify the message and support script language to establish ASN.1 message.

3. The message generation method is independent from the message definition, and the ASN.1 message corpus can apply the way of plug-in which is automatically generated through MAKEFILE compiling ASN.1 file, thus easily modifying and updating the message and lessening the workload of maintenance.

4. The device is universal and does not rely on a special ASN.1 structure type or ASN.1 compiler.

I claim:

1. An object-oriented management device for an ASN.1 message, comprising:
   at least one computing device,
   an ASN.1 bottom support module for compiling the ASN.1 message into a programming language example code;
   a common manipulation module for processing the message to support message applications;
   wherein, the device further comprises a message plug-in for generating message corpus plug-in from the code generated by the ASN.1 bottom support module, with a class description table being a plug-in interface;
   during generating the message corpus plug-in, using virtual functions to supplement class description information including class structure description information and functions for creating a class example; adding a support of class example manipulation for the generated code; establishing a TopClass class description table including the corresponding relationship between a TopClass name and a description in the generated code, and the TopClass is a top-layer class but not a child-class;
   wherein the common manipulation module or the message plug-in is used to recover a programming language message example from data of VAL format; and
   each module being executable in the at least one computing device.

2. The device of claim 1, wherein said programming language example code is C++ or JAVA™ programming code.

3. The device of claim 1, wherein for a simple data type and a composite data type, said common manipulation module or message plug-in supplements type name, integer value and class example create function of the data type; for SET and SEQUENCE data, supplements a name of each member, sets whether the data type is optional and supplements the corresponding table of the member's description information; for ENUM, supplements the corresponding table between a member symbol and a number value.

4. The device of claim 1, wherein said common manipulation module or message plug-in adds the class description table in the programming language example code, shows the class description information in a form of class description table, takes a class name as a key word, and sorts elements in the table according to the class name or makes them as a hash table to be indexed conveniently.

5. The device of claim 1, wherein:
   for the simple data type, adding the support of the class example manipulation in the programming language example code by the common manipulation module or the message plug-in comprises:
   adding a support of the virtual functions to obtain and set a data value;
   for the composite data type, adding the support of the class example manipulation in the programming language example code by the common manipulation module or the message plug-in comprises:
   a) adding a support of a point marker path;
   b) adding a support of setting a symbol to show whether members in SEQUENCE and SET exist or not;
   c) adding a support of obtaining a length of a data array, setting the length of data and traversing elements in the data array for a SEQUENCE OF data array and a SET OF data array;
   d) adding a support of a selection operation for CHOICE data;
   e) adding a support of setting ANY data, which can set or obtain a variable of a real type;
   f) adding a support of obtaining an object of the corresponding child-node through the point maker.

6. The device of claim 1, wherein the common manipulation module uses an AsnTreeObject tree link list to indicate a structure of the ASN.1 message.

7. The device of claim 1, wherein the common manipulation module or the message plug-in is used to generate VAL data from the generated code.

8. The device of claim 7, wherein the common manipulation module or the message plug-in is used to convert the VAL data into XML data.

9. The device of claim 6, wherein said object-oriented management device for an ASN.1 message also comprises a graphic interface package and a graphic message edition module,
   wherein said graphic interface package is used to develop a graphic interface;
   said graphic message edition module uses the graphic package and the common manipulation module to provide a user with a graphic interface message edition function to modify, create and edit the ASN.1 message by a way of modifying the AsnTreeObject tree link list.

10. The device of claim 6, wherein said object-oriented management device for ASN.1 message also comprises a script support package and a message script manipulation module,
    wherein said script support package is used to run a script and support script extension;
    said message script manipulation module uses the script support package and the common manipulation module to add an ASN.1 message manipulation function in the script to modify, create and edit the ASN.1 message by the way of modifying the AsnTreeObject tree link list.

11. The device of claim 2, wherein the common manipulation module uses an AsnTreeObject tree link list to indicate a structure of the ASN.1 message.

12. The device of claim 3, wherein the common manipulation module uses an AsnTreeObject tree link list to indicate a structure of the ASN.1 message.

13. The device of claim 4, wherein the common manipulation module uses an AsnTreeObject tree link list to indicate a structure of the ASN.1 message.

14. The device of claim 5, wherein the common manipulation module uses an AsnTreeObject tree link list to indicate a structure of the ASN.1 message.

* * * * *